US012493000B2

(12) United States Patent
Brown et al.

(10) Patent No.: US 12,493,000 B2
(45) Date of Patent: Dec. 9, 2025

(54) PHOTONIC INTEGRATED CIRCUIT AND CHARACTERIZATION METHOD

(71) Applicant: University of Rochester, Rochester, NY (US)

(72) Inventors: Thomas G. Brown, Rochester, NY (US); Debra Saulnier, Denver, CO (US); Tyler Howard, Rochester, NY (US)

(73) Assignee: University of Rochester, Rochester, NY (US)

( * ) Notice: Subject to any disclaimer, the term of this patent is extended or adjusted under 35 U.S.C. 154(b) by 269 days.

(21) Appl. No.: 18/033,928

(22) PCT Filed: Oct. 29, 2021

(86) PCT No.: PCT/US2021/057316
§ 371 (c)(1),
(2) Date: Apr. 26, 2023

(87) PCT Pub. No.: WO2022/094253
PCT Pub. Date: May 5, 2022

(65) Prior Publication Data
US 2023/0324311 A1 Oct. 12, 2023

Related U.S. Application Data

(60) Provisional application No. 63/217,070, filed on Jun. 30, 2021, provisional application No. 63/107,410, filed on Oct. 29, 2020.

(51) Int. Cl.
*G02B 6/122* (2006.01)
*G01N 21/47* (2006.01)
*G01N 21/95* (2006.01)

(52) U.S. Cl.
CPC ......... *G01N 21/9501* (2013.01); *G01N 21/47* (2013.01); *G02B 6/122* (2013.01); *G01N 2021/4792* (2013.01)

(58) Field of Classification Search
CPC .................. G01M 11/30; G01M 11/35; G01N 2021/4792; G01N 2021/6463;
(Continued)

(56) References Cited

U.S. PATENT DOCUMENTS 7,831,123 B2 * 11/2010 Sparacin ............. G02B 6/1223
385/132
7,973,924 B2 * 7/2011 Noda ..................... B82Y 20/00
356/300

(Continued)

FOREIGN PATENT DOCUMENTS

KR 2012 0026367 A 3/2012

OTHER PUBLICATIONS

Extended European Search Report in corresponding European Patent application No. 21887626, dated Sep. 4, 2024, 12 pages.
(Continued)

*Primary Examiner* — Georgia Y Epps
(74) *Attorney, Agent, or Firm* — Cozen O'Connor

(57) ABSTRACT

A method for characterizing a photonic integrated circuit comprising includes coupling an evanescent field into a scattering element adjacent to a guiding layer of the photonic integrated circuit. The evanescent field is of an optical mode of light propagating in the guiding layer, and has an in-medium wavelength in the guiding layer. A maximum spatial dimension of the scattering element is less than the in-medium wavelength. The method includes scattering, with the scattering element, the coupled evanescent field as
(Continued)

a reference scattered-signal. The method also includes detecting one of the reference scattered-signal and a signal derived therefrom.

20 Claims, 10 Drawing Sheets

(58) Field of Classification Search
CPC ........... G01N 2021/9511; G01N 21/17; G01N 21/47; G01N 21/63; G01N 21/64; G01N 21/645; G01N 21/648; G01N 21/65; G01N 21/658; G01N 21/95; G01N 21/9501; G02B 6/10; G02B 6/12; G02B 6/12004; G02B 6/122; G02B 6/126; G02B 6/13; G02B 6/26; G02B 6/262; G02B 6/27; G02B 6/2726; G02B 6/33; G02B 6/34
See application file for complete search history.

(56) References Cited

U.S. PATENT DOCUMENTS

| | | | | |
|---|---|---|---|---|
| 8,068,706 | B2 * | 11/2011 | Popovic | G02B 6/12007 |
| | | | | 385/28 |
| 8,116,624 | B1 * | 2/2012 | Wach | G01M 11/35 |
| | | | | 398/28 |
| 9,111,730 | B2 * | 8/2015 | Rabiei | G02F 1/035 |
| 10,468,849 | B1 * | 11/2019 | Bradley | H01S 3/163 |
| 10,838,148 | B2 * | 11/2020 | Hasan | G02B 6/13 |
| 11,099,135 | B2 * | 8/2021 | Bovero | G01L 1/00 |
| 2004/0105476 | A1 | 6/2004 | Wasserbauer | |
| 2014/0193115 | A1 | 7/2014 | Popovic | |
| 2015/0001175 | A1 * | 1/2015 | Rabiei | G02F 1/3558 |
| | | | | 216/24 |
| 2018/0081118 | A1 | 3/2018 | Klamkin et al. | |
| 2020/0003956 | A1 | 1/2020 | Kuo et al. | |
| 2020/0116489 | A1 * | 4/2020 | Wang | G02B 6/42 |
| 2022/0187535 | A1 * | 6/2022 | Endo | G02B 6/1225 |

OTHER PUBLICATIONS

Jagerska J et al: "Coupling length of silicon-on-insulator directional couplers probed by Fourier-space imaging", Applied Physics Letters, American Institute of Physics, 2 Huntington Quadrangle, Melville, NY 11747, vol. 92, No. 15, Apr. 15, 2008 (Apr. 15, 2008), pp. 151106-151106, XP012106442, ISSN: 0003-6951, DOI: 10.1063/1.2909575.

Chandrasekar Rohith et al: "Photonic integrated circuits for Department of Defense-relevant chemical and biological sensing applications: state-of-the-art and future outlooks", Optical Engineering, Society of Photo-Optical Instrumentation Engineers, 1000 20th St. Bellingham WA 98225-6705 USA, vol. 58, No. 2, Feb. 1, 2019 (Feb. 1, 2019), p. 20901, XP060152779, ISSN: 0091-3286, DOI: 10.1117/1.OE.58.2.020901.

International Search Report and Written Opinion of the International Searching Authority for International Patent Application No. PCT/US2021/057316 mailed Feb. 24, 2022, pages.

* cited by examiner

PHOTONIC INTEGRATED CIRCUIT AND CHARACTERIZATION METHOD

CROSS-REFERENCE TO RELATED APPLICATIONS

This application is a National Stage Application of PCT/US2021/057316, filed on Oct. 29, 2021, which benefits from and claims priority to U.S. provisional patent application Ser. No. 63/107,410, filed on Oct. 29, 2020 and U.S. provisional patent application Ser. No. 63/217,070 filed Jun. 30, 2021, the disclosures of which are incorporated herein by reference in their entirety.

BACKGROUND

Photonic integrated circuits include photonic devices and waveguides combined in such a way as to perform functions of a circuit (e.g., for communications, signal processing, or sensing). Testing, assembly, and packaging of photonic integrated circuits requires a series of advanced, often non-standard, steps to verify the waveguide and device quality. Some of these tests are carried out at the wafer level, within the foundry, to assure that individual layers have the correct thickness and material quality. However, many additional tests must be carried out, first at the (finished) wafer level, and then after the wafer is separated (singulated) into individual die for packaging. The goal of much of this testing is to identify 'known good die'-chips that function as expected. Identifying known good die (and discarding inferior chips) is very cost-effective, since the expensive packaging process is not applied to inferior chips.

State of the art polarization testing in photonic integrated circuits is limited, with the primary method using a loop-back waveguide measuring the polarization of the output light. The application of this method is costly, time consuming, and requires specialized equipment as two fibers must be coupled to the chip, with one fiber providing the input light and another measuring the return signal.

SUMMARY

Embodiments disclosed herein include systems and methods for polarization testing of photonic integrated circuits using subwavelength photonic test points that may be read remotely with a suitable combination of a microscope, polarimetric optics, and image sensor. Embodiments described herein make use of small (subwavelength) scatterers designed into the circuit as part of the foundry process that will scatter known amounts of light with a known polarization state into a microscope designed for collecting and imaging light from photonic integrated circuits. The scatterer's spatial dimension is much less than one wavelength and will therefore scatter light in a manner similar to a dipole antenna, where the polarization of the dipole aligns with the polarization state of the waveguide mode.

In a first aspect, a photonic integrated circuit includes a substrate, a cladding layer, and a guiding layer. The substrate has a substrate top-surface and a substrate refractive index. The cladding layer is on the substrate top-surface and has a cladding top-surface and a cladding refractive index. The guiding is layer located between the substrate top-surface and the cladding top-surface and having (i) a core refractive index exceeding both the substrate refractive index and the cladding refractive index, (ii) a guiding-layer thickness above the substrate top-surface, and (iii) a guiding-layer width. In a direction parallel to the substrate top-surface, the guiding layer supports an optical mode that extends to a decay-range into the cladding layer in the direction. An in-medium wavelength of the optical mode exceeds both the guiding-layer thickness and the guiding-layer width. The scattering element is (i) located between the substrate top-surface and the cladding top-surface and (ii) separated from the guiding layer by a gap-distance that is less than the decay-range, and has (a) a maximum spatial dimension that is less than the in-medium wavelength, and (b) a scattering refractive index that exceeds the cladding refractive index.

In a second aspect, a method for characterizing a photonic integrated circuit comprising includes coupling an evanescent field into a scattering element adjacent to a guiding layer of the photonic integrated circuit. The evanescent field is of an optical mode of light propagating in the guiding layer, and has an in-medium wavelength in the guiding layer. A maximum spatial dimension of the scattering element is less than the in-medium wavelength. The method includes scattering, with the scattering element, the coupled evanescent field as a reference scattered-signal. The method also includes detecting one of the reference scattered-signal and a signal derived therefrom.

DETAILED DESCRIPTION OF THE EMBODIMENTS

Figure 1:
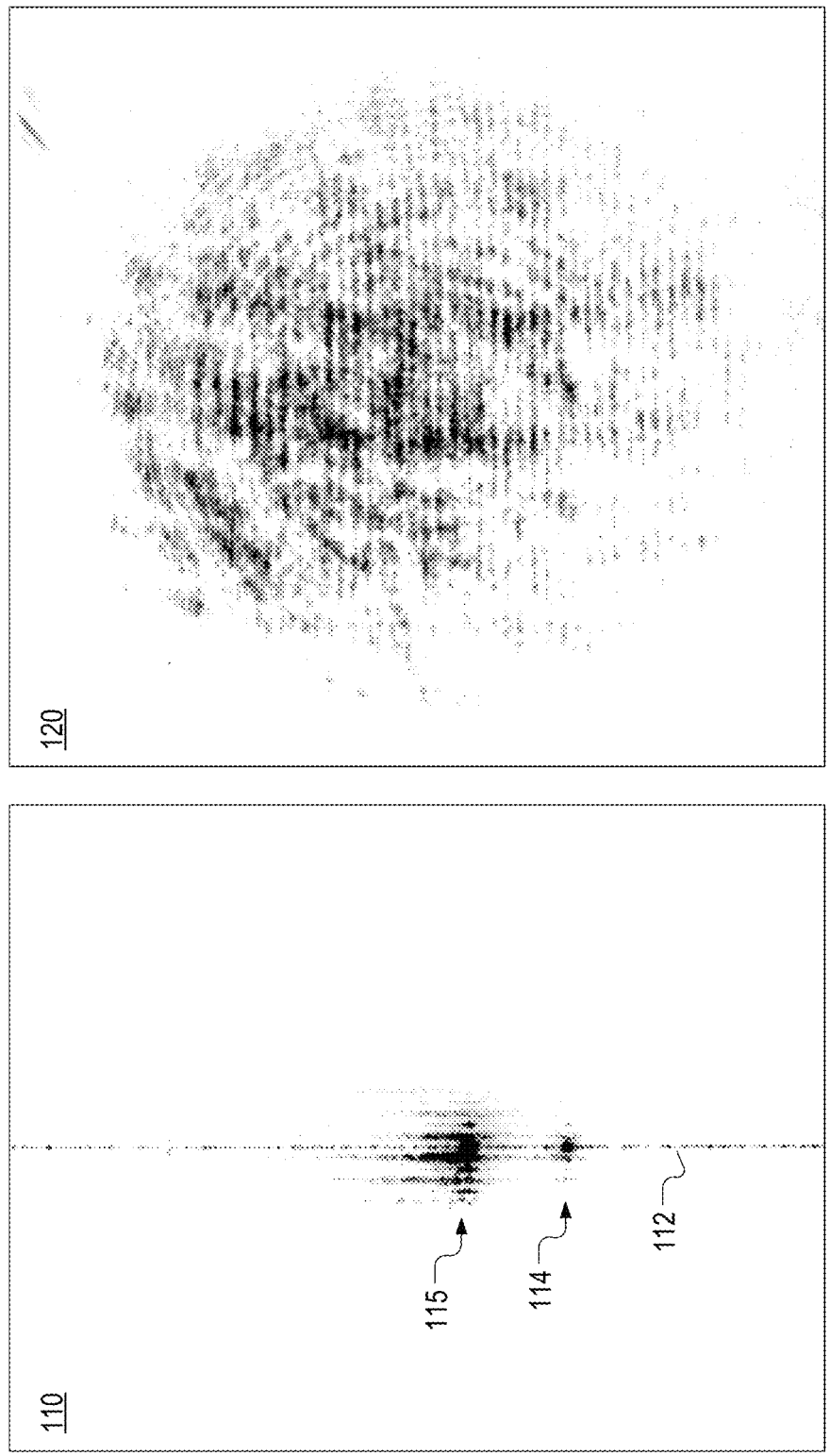
FIG. 1 illustrates (i) light scattering in a waveguide caused by two nano-indentations of the waveguide cladding and (ii) resulting interference fringes.

To provide quantitative information about light within a photonic integrated circuit (PIC), it is preferable to scatter a small amount of light to a sensor without significantly depleting the amount of light available in the circuit. It is also desirable to scatter the light such that very little chip area is used. For example, while a grating coupler scatters light from a waveguide up toward a camera, it scatters a very large amount of light, is typically relatively large (as large as ten micrometers or more in size), and scatters in a manner that is strongly dependent on the wavelength and polarization of the light. While a grating coupler is potentially useful for sparse probing, it is not well suited for probing many test points simultaneously. Random scattering may also be used, but it is very difficult to measure scattering to characterize a waveguide, e.g., loss of low-loss waveguides, because of the large random variations in scattered intensity along the guide.

In addition to the above-referenced limitations, it is difficult to measure quantitative and precise polarization information about the light propagating within a waveguide. This is because grating couplers sample an extended range along the waveguide and modify polarization in the process. Near-field probes can sample the evanescent field accurately, but modern PIC design requires that the evanescent fields be negligible at the surface of the chip.

Embodiments disclosed herein remedy the aforementioned problems via a true subwavelength probe of the fields in the waveguide that (i) may be fabricated with the waveguide in a single process and (ii) scatters light in a way that can be easily sensed with a microscope equipped with polarization-sensitive electronic imaging. A small scatterer (one that has dimension much smaller than the wavelength of light), when placed in proximity to the waveguide, scatters light in a manner similar to a dipole source whose polarization is aligned with the polarization of the local field at the point of the scatterer. A scatterer defined in a foundry process will thus scatter light into the collection aperture of the microscope in a manner that is deterministic and dependent on the polarization state and phase of the light in the waveguide.

Scattering from Evanescent Fields

A single-mode waveguide guides optical energy as a propagating mode, the electric fields of which extend beyond the physical boundary of the waveguide core. The necessary condition for light guiding in this manner is that the refractive index of the core be greater than that of the surrounding material, the cladding. Well known waveguide geometries include slab waveguides (in which the light is trapped in one dimension within a thin film but may spread out in the other direction), ridge and rib waveguides (in which a thicker region of the core serves to confine light in two dimensions), and a photonic wire (in which a core region is completely surrounded by a cladding region). Embodiments disclosed herein are directed to a waveguide such as (i) silicon surrounded by silicon dioxide and (ii) silicon nitride surrounded by silicon dioxide. The waveguide may be one of a slab waveguide, a rib waveguide, or a photonic wire.

For small enough core sizes, the guide supports only a single mode with fields extending into a lower-index cladding. These fields, known as evanescent fields, typically decay exponentially into the cladding region in a manner that is wavelength and polarization dependent. When there is negligible material absorption and when the boundaries are perfectly smooth, the optical mode propagates along the guide with no loss. However, any deviation from a perfectly smooth boundary perturbs the wave and scatter a portion of the guided energy into the cladding regions.

In accord with teachings described hereinbelow, a very small scattering region placed in the evanescent field scatters light into three dimensions in a manner similar to a dipole source, in which the scatterer has a polarizability tensor that, when multiplied by the local field at the scatterer, radiates a polarized field into the collection aperture of a microscope objective.

Photonic Integrated Circuit Fabrication

Embodiments disclosed herein therefore combine a subwavelength scatterer that is adjacent to a waveguide with a means of remotely detecting the scattered light to obtain precise quantitative information about the polarization of light within the guide. The scatterer may be adjacent to the waveguide in any direction that is perpendicular to the direction of light propagation in the waveguide. By precisely defining the location and size of the scatterer, that quantitative information may include at least one of the power and polarization state of the guided mode. In embodiments, multiple scatterers are located at precise locations along the waveguide, which enables measurement of properties such as waveguide scattering loss, component loss, splitting ratio at couplers, efficiency and efficacy of polarization rotators, and a variety of other waveguide and circuit parameters.

One way to introduce a scatterer into a photonic circuit is to penetrate the upper cladding with a nano-indenter. A nano-indenter is a device usually used to measure the mechanical properties of materials by applying a known force to a diamond anvil that is very sharp (submicron dimensions) at its tip. With a suitable force, it can penetrate into the cladding material and create a small void in the proximity of the optical waveguide.

FIG. 1 shows an example a nano-indenter applied to a photonics chip, and illustrates how one or more of these scatterers scatters light into the camera. FIG. 1 includes images 110 and 120, each of which is inverted to better illustrate scattered light and interference fringes. Image 110 is of light scattering from light guided along a silicon waveguide 112 whose cladding has been penetrated by a nano-indenter at two points 114 and 115 along waveguide 122. Image 120 is a pupil image of waveguide 112 and points 114, 115. Image 120 was formed using a Bertrand lens, and shows interference fringes formed from the interference of light scattered by points 114 and 115. A relatively small scatterer placed in proximity to the guide scatters a small fraction of the energy to the camera; however, the power level collected is easily detected above the other light scattered from the surface.

Nano-indenters have the disadvantage that they are difficult to place accurately; such placement is time consuming and requires expensive instrumentation. An alternative is to use a scatterer that is designed into the semiconductor foundry fabrication process, preferably made out of the same materials used in the standard process, done in such a way that the dimensions are a repeatable part of the process, and accomplished in a way that does not require extra layers beyond those normally used in the PIC fabrication. Furthermore, the scatterer should be small (less than the wavelength of light in each dimension) and have a significantly different refractive index when compared to the cladding, which may be formed of silicon dioxide.

In a semiconductor photonics foundry process, waveguide layers may include (i) a lower waveguide-layer (formed from a first material), (ii) a middle waveguide-layer placed just above the lower waveguide (formed from a second material), and (ii) an upper waveguide-layer placed just above the middle waveguide (formed from a third material). The first material may be a semiconductor, such as silicon. Each of the second and third materials may be a dielectric, such as silicon nitride. Embodiments disclosed herein are directed to scatterers formed in the layer just above or just below the primary guiding waveguide. For example, when the primary waveguide is in the lower waveguide-layer and formed in the first material, the scatterer may be formed from the second material and be located in the middle waveguide-layer. When the primary waveguide is the middle waveguide-layer, the scatterer may be either formed of the first material and be part of the lower-waveguide layer, or be formed of the third material of the upper waveguide-layer. Finally, when the primary waveguide is the upper waveguide-layer, the scatterer may be formed from the middle waveguide-layer.

Figure 7:
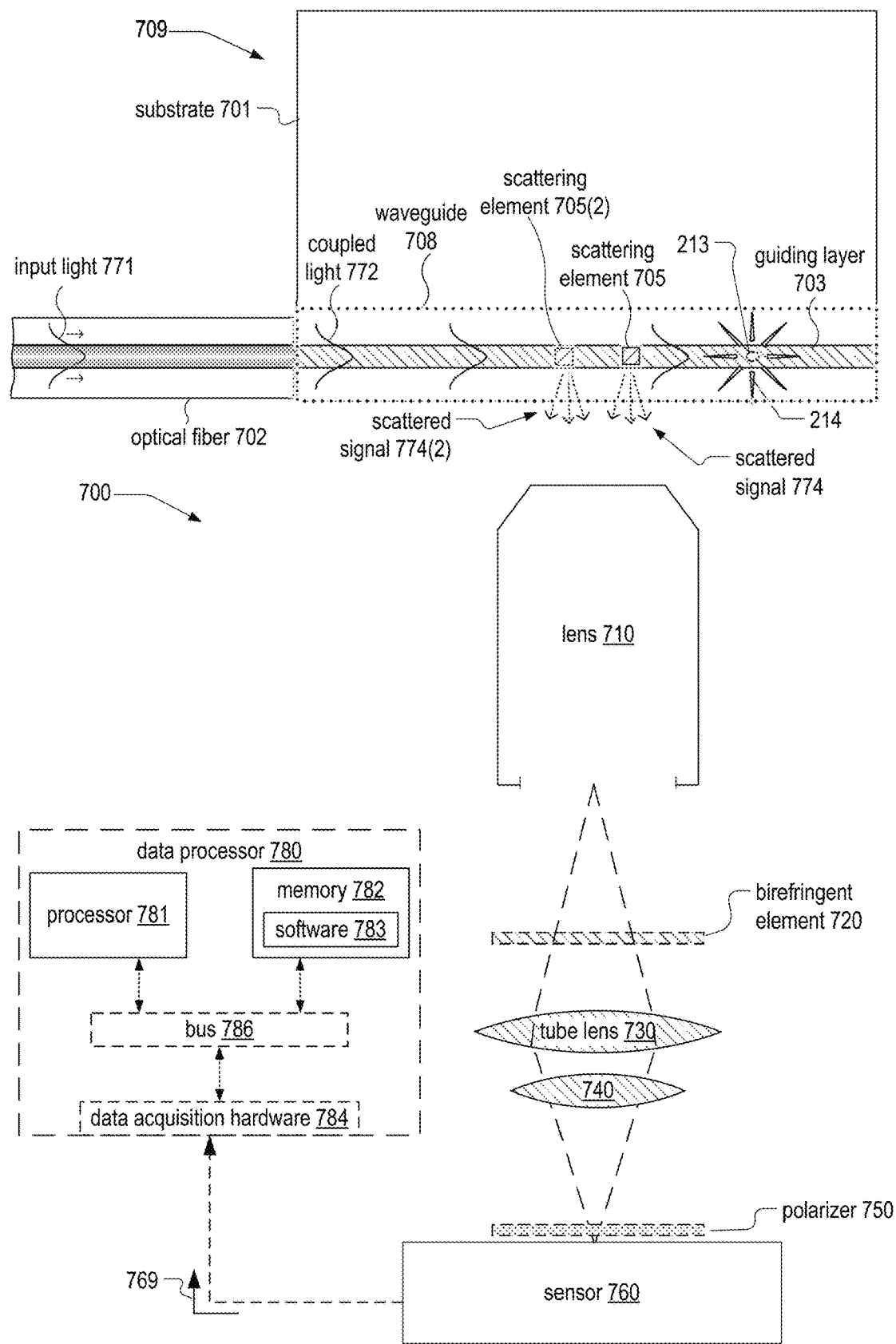
FIGS. 7 and 8 are respective schematics of a first and a second apparatus characterizing polarization of light guided in a photonic integrated circuit, in an embodiment.
Figure 8:
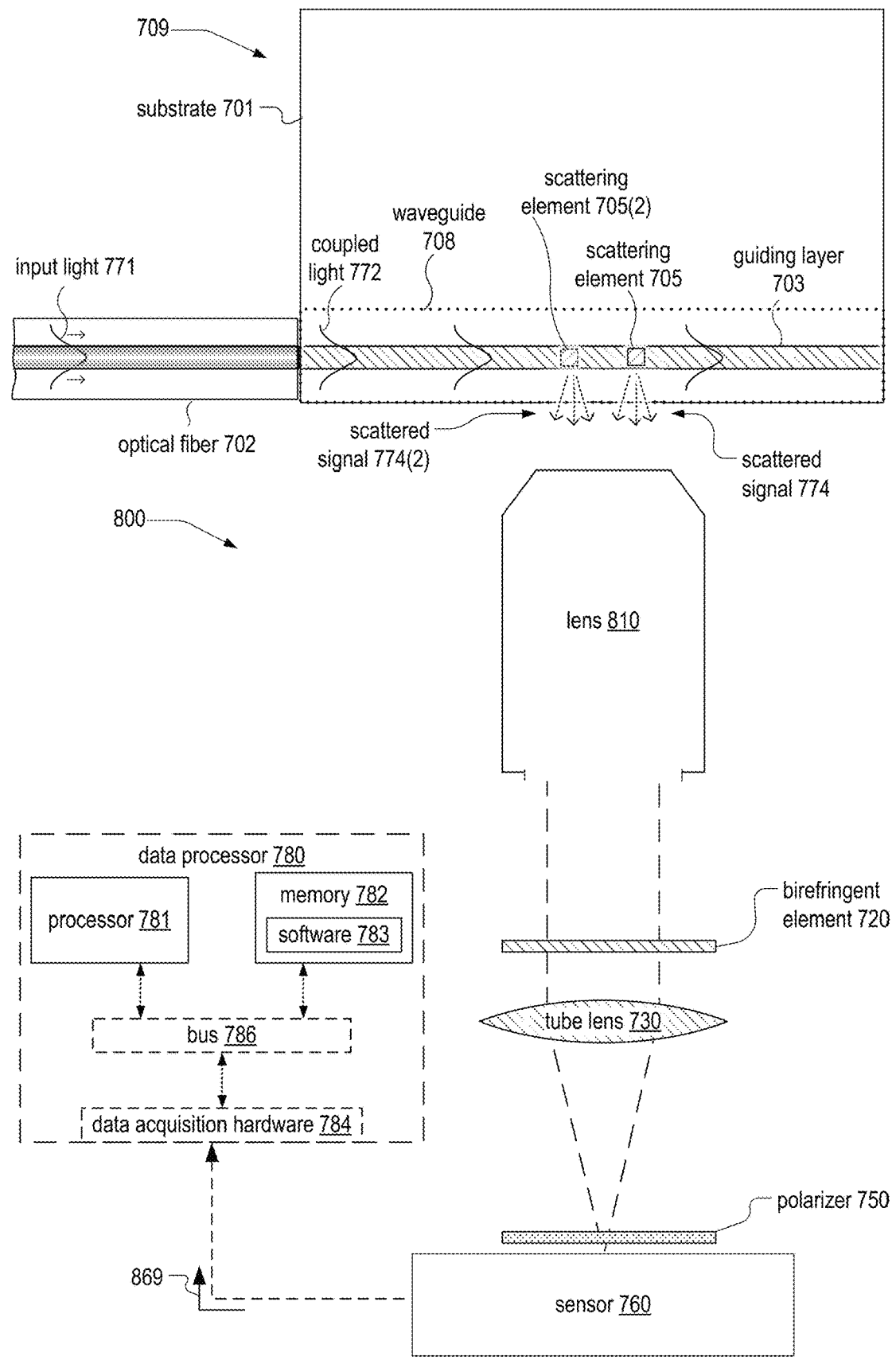

In embodiments, a scattering and detection method employs at least one semiconductor subwavelength scattering element above a waveguide (FIGS. 2 and 3), or beside a waveguide (FIGS. 7 and 8). When the scattering element is beside the waveguide, the scattering element and the waveguide are in the same layer above a substrate. The scattering elements produce an observable bright spot of scattered light compared with the background. The intensity of the bright spot may be approximately twenty times that of light scattered from waveguide imperfections. Placement of multiple scattering elements along the waveguide allows for a quantitative analysis of the amount of light lost along the waveguide.

Figure 2:
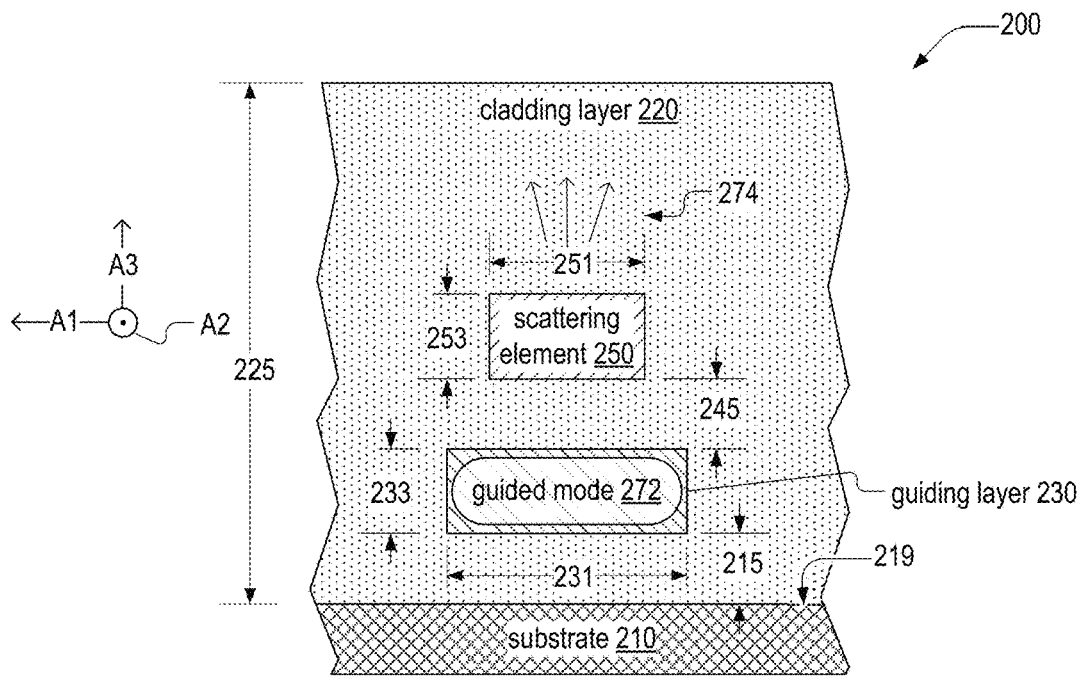
FIGS. 2 and 3 are respective views of a first photonic integrated circuit, in an embodiment.
Figure 3:
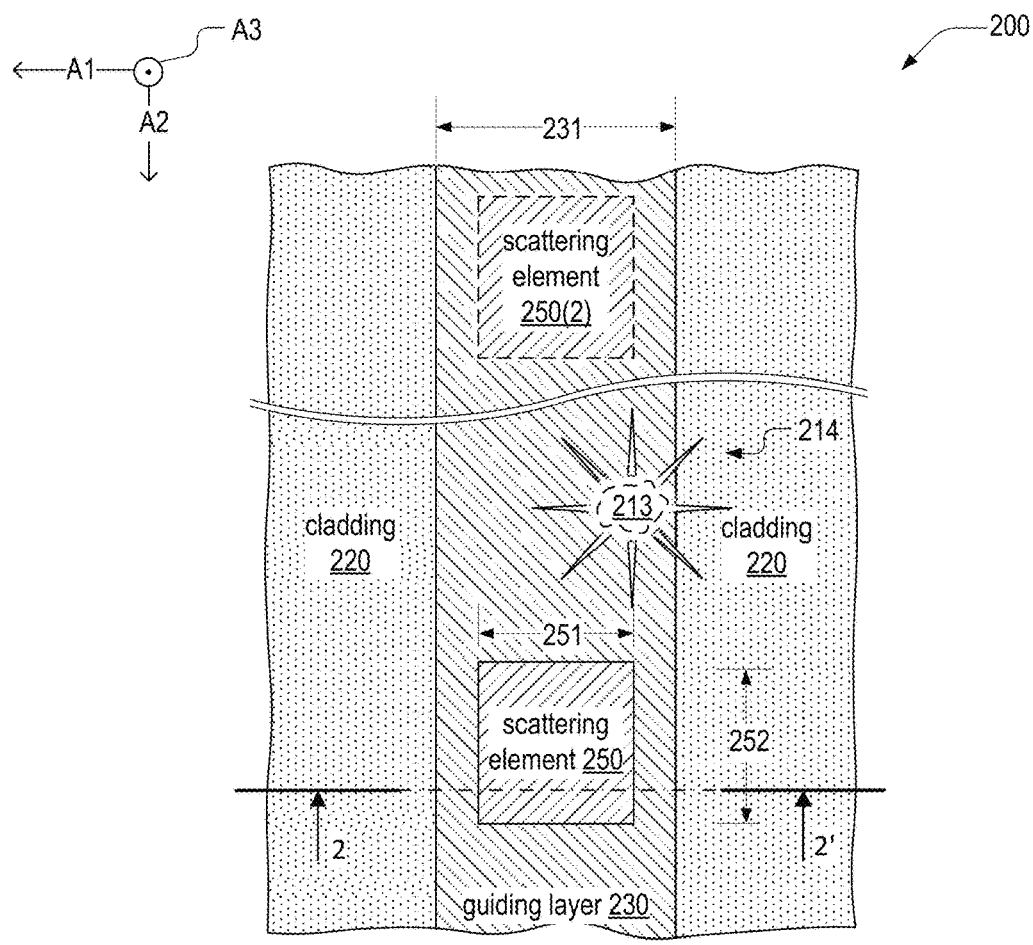

FIG. 2 is a schematic cross-sectional view layout of a photonic integrated circuit 200, hereinafter PIC 200. FIG. 3 is a plan view of PIC 200. The cross-sectional view of FIG. 2 is in a cross-sectional plane 2-2' shown in FIG. 3. PIC 200 includes a substrate 210, a cladding layer 220, a guiding layer 230, and a scattering element 250. In embodiments, at least one of: substrate 210 is formed of silicon, cladding layer 220 is formed of silicon dioxide, guiding layer 230 is formed of silicon, and scattering element 250 is formed of silicon-nitride. PIC 200 may include additional scattering elements 250($k$=2, 3, . . . , N), for example scattering element 250(2), where k is a positive integer less than or equal to N. Additional scattering elements 250 allow simultaneous monitoring of optical power in guiding layer 230 at multiple locations.

Guiding layer 230 has dimensions 231 and 233 along axes A1 and A3 respectively. Axis A3 is perpendicular to a top surface 219 of substrate 210. In embodiments, dimension 231 is between 430 nm and 530 nm, and dimension 233 is between 170 nm and 270 nm. For example, dimensions 231 and 233 may be 480 nm and 220 nm respectively.

FIG. 2 denotes distance 215 between guiding layer 230 and substrate 210 in direction A3. In embodiments, distance 215 is between one micrometer and five micrometers. Distance 215 may be less than one micrometer, for example, equal to zero, such that guiding layer 230 is directly on top surface 219 of substrate 210.

Scattering element 250 has spatial dimensions 251, 252, and 253 along axes A1, A2, and A3 respectively, each of which may be between 0.1 micrometers and 0.5 micrometers. In embodiments, the minimum value of dimensions 251, 252, and 253 is determined by limits of the lithographic resolution of the photonic integrated circuit fabrication hardware and process used to fabricate scattering element 250. In embodiments, dimensions 251, 252, and 253 are 200 nm, 200 nm and 220 nm, respectively. Scattering element 250 may be equivalent to a section of waveguide designed for guiding 1.3-micrometer light, e.g., such that it is formed of silicon nitride, dimension 251 is between 1.1 and 1.3 micrometers, and dimension 253 is between 200 nm and 240 nm.

Along axis A3, scattering element 250 is separated from guiding layer 230 by a gap-distance 245. Herein γ denotes a distance, along axis A3, from guiding layer 230 at which the intensity of a lowest-order optical mode of guiding layer 230 decays to 1/e of its maximum value. In embodiments, gap-distance 245 is at least one of (i) greater than γ to ensure weak coupling and (ii) less than 6γ to ensure adequate coupling. For example, gap-distance 245 may be between 0.1 micrometers and 0.5 micrometers.

Cladding layer 220 has a thickness 225, which may be at least two times the free-space wavelength of light propagating in guiding layer 230. Such a thickness is sufficient to prevent scattering of guided mode 272 by dirt or impurities on a top surface of cladding layer 220. In embodiments, cladding layer 220 is between two times and five times the free-space wavelength. In embodiments, the free-space wavelength is between 1.0 micrometers and 2.0 micrometers.

At visible and near-infrared wavelengths, silicon nitride has a higher refractive index than silicon dioxide. Accordingly, when scattering element 250 and cladding layer 220 are formed of silicon nitride and silicon dioxide respectively, scattering element 250 has a higher refractive index than cladding layer 220, such that scattering element 250 supports a propagating guided mode.

In embodiments, at least one of dimension 231 and dimension 233 is determined such that guiding layer 230 supports single-mode low loss propagation. The number of modes in a slab waveguide at a free-space wavelength $\lambda_0$ is the smallest integer M greater than $2(d/\lambda_0)NA$, where d is the layer thickness and NA is the waveguide's numerical aperture. For a slab waveguide, $$NA = \sqrt{n_1^2 - n_2^2},$$

where $n_1$ and $n_2$ are the refractive indices of the core (guiding layer 230) and the cladding (cladding layer 220) respectively. For single-mode operation M=1. In embodiments, $2(d/\lambda_0)NA<1$ for single mode operation. For two-dimensional confinement, each of dimension 231 and dimension 233 of guiding layer 230 is designed in a manner similar to that of the thickness of an equivalent slab waveguide. That is, both $2(d_{231}/\lambda_0)NA<1$ and $2(d_{233}/\lambda_0)NA<1$, where $d_{231}$ and $d_{233}$ equal dimension 231 and dimension 233 respectively.

In an example mode of operation, a guided mode 272 propagating in guiding layer 230 evanescently couples with scattering element 250, which produces a scattered signal 274. Scattering element 250 may be a dipole scattering element whose dipole moment aligns with the polarization guided mode 272. This evanescent coupling allows for measurement of polarization states in guiding layer 230. Keeping the scattering element 250 small, subwavelength for example (where candidate wavelengths include those between 1.0 micrometers and 2.0 micrometers, such as 1.3 micrometers or 1.55 micrometers), scattering element 250 perturbs guided mode 272 and produces a sufficiently weak perturbation in the mode with negligible power lost in the guided mode. While FIG. 2 illustrates scattered signal 274 propagating away from scattering element 250 in predominantly axis A3, scattered signal may also propagate in additional directions, such as long axis A1.

Measuring Light from Multiple Scatterers

In optics, one may either measure an absolute quantity (guided power, polarization state, etc.) or one may measure differences. For example, one may measure a phase difference between two scattering elements 250, which gives information about the optical path in the section of guiding layer 230 between the two scattering elements 250. Alternatively, one may measure the difference in scattered power between two identical scattering elements 250 placed at different points on, above, or adjacent to guiding layer 230. A measurement of the phase difference provides an accurate measure of the effective index of guiding layer 230, provided the physical path length between the two scattering elements 250 is known. A measurement of the phase difference as a function of wavelength provides information about dispersion or other properties of guiding layer 230. A measurement of the difference in image irradiance between two scattering elements 250 provides information about the loss of guiding layer 230.

Irradiance measurements may be accurately carried out using direct imaging, since the electronic sensor signal strength is determined by the number of photons per pixel per frame absorbed in a sensor element. High quality microscopes and sensors may provide repeatable power measurements independent of the position of the source in the microscope. Thus, a single image may provide the relative power level from multiple scattering elements 250 during the time it takes to capture one image frame. Accurate measurements of the phase difference between two scatterers require an interferometric measurement; for that, one may reconfigure the microscope to replace the tube lens (of FIG. 7 for example) with either a Bertrand lens (a.k.a. a phase telescope) or a cylindrical lens such that a pupil plane image is projected to the sensor. Any pair of scattering elements 250, when imaged in this fashion, behave like a pair of Young's slits, and produce a periodic fringe pattern in the pupil of the objective. The orientation of the fringe pattern yields the orientation of the scatterers; the period of the fringe pattern yields the physical separation of the scatterers. In this way, PIC 200 may include multiple scattering elements 250, placed as test points, at various positions along guiding layer 230 within PIC 200. Provided each pair of scatterers has a unique separation and orientation, they will interfere to form a uniquely identified fringe pattern in the exit pupil of the objective.

Figure 4:
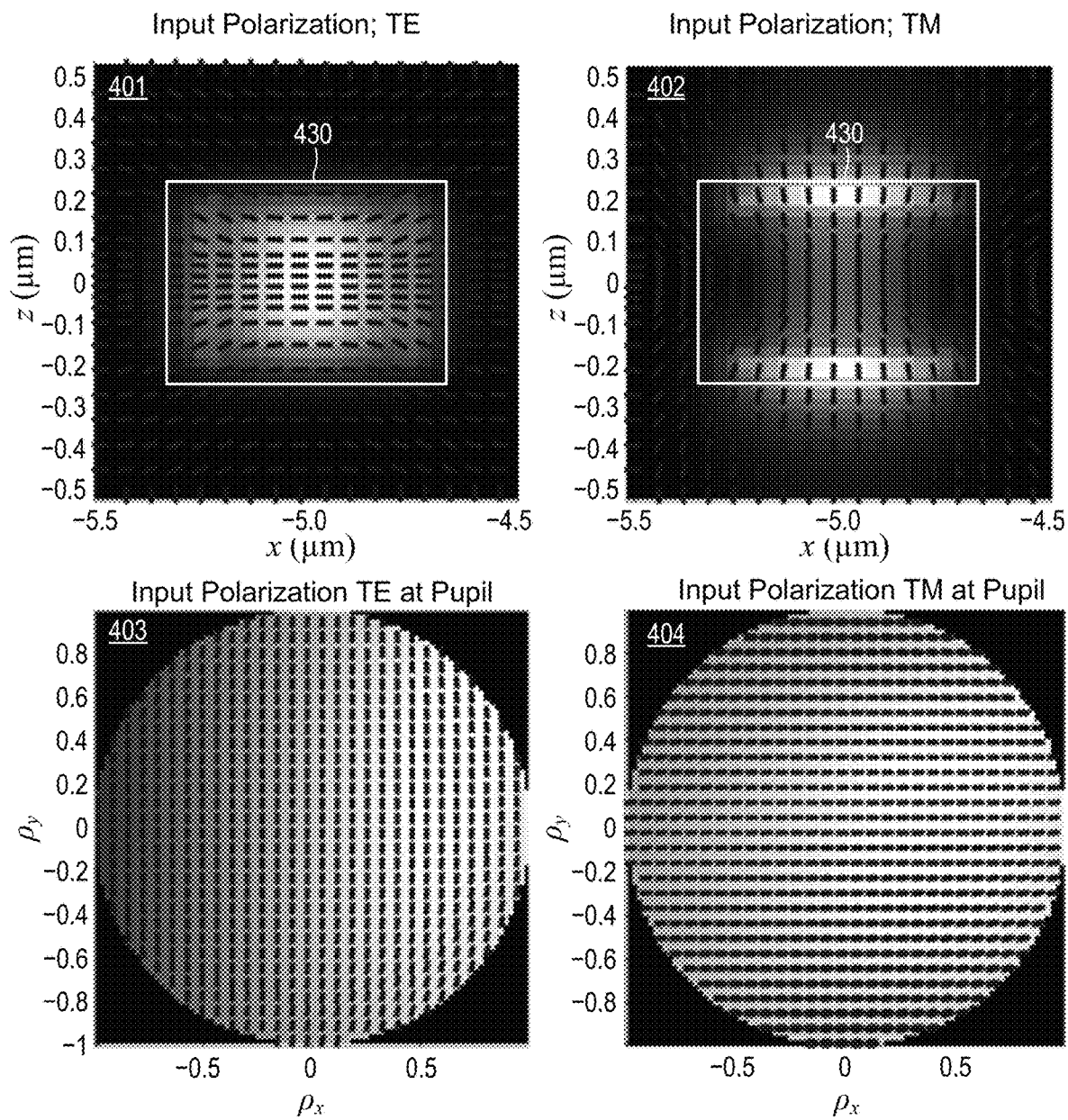
FIG. 4 illustrates the input states of a guided wave (top) and numerically calculated output polarization distribution at the pupil (bottom) for a silicon-nitride scatterer.

For example, FIG. 4 includes plots 401-404. Plots 401 and 402 illustrate respective input states of a guided wave in a silicon waveguide 430. Plots 403 and 404 illustrate numerically calculated output polarization distributions at the pupil for a 200-nm×200-nm silicon-nitride scatter above silicon waveguide 430. The scattering element and waveguide 430 are respective examples of scattering element 250 and guiding layer 230. Uniform, orthogonal polarizations in the pupil for TE and TM guided waves allows for accurate polarization state measurements. Plots 401 and 402 show intensity of a single TE mode and a single TM mode of silicon waveguide 430 respectively, with polarization vectors superimposed thereon.

Scatterer Adjacent to Waveguide

Figure 5:
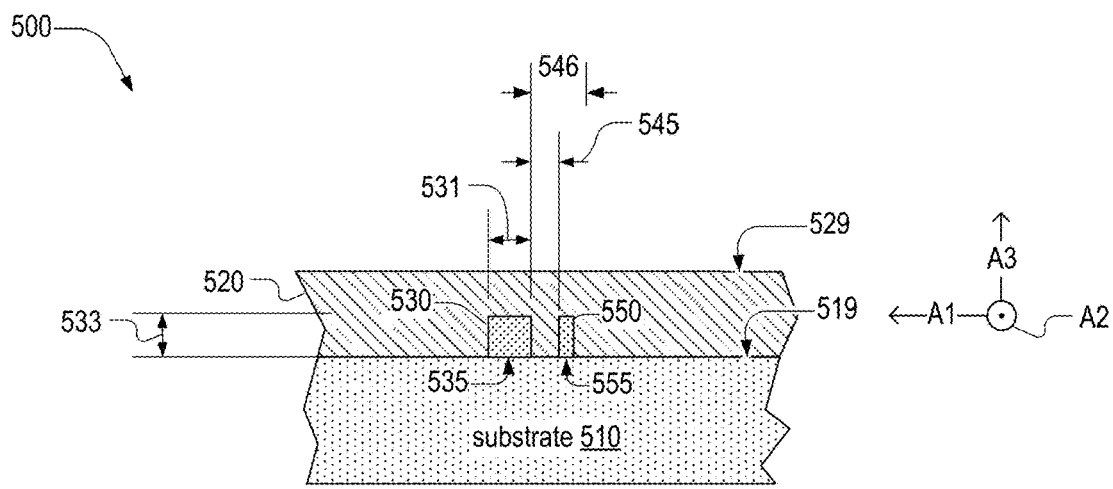
FIGS. 5 and 6 are respective views of a second photonic integrated circuit, in an embodiment.
Figure 6:
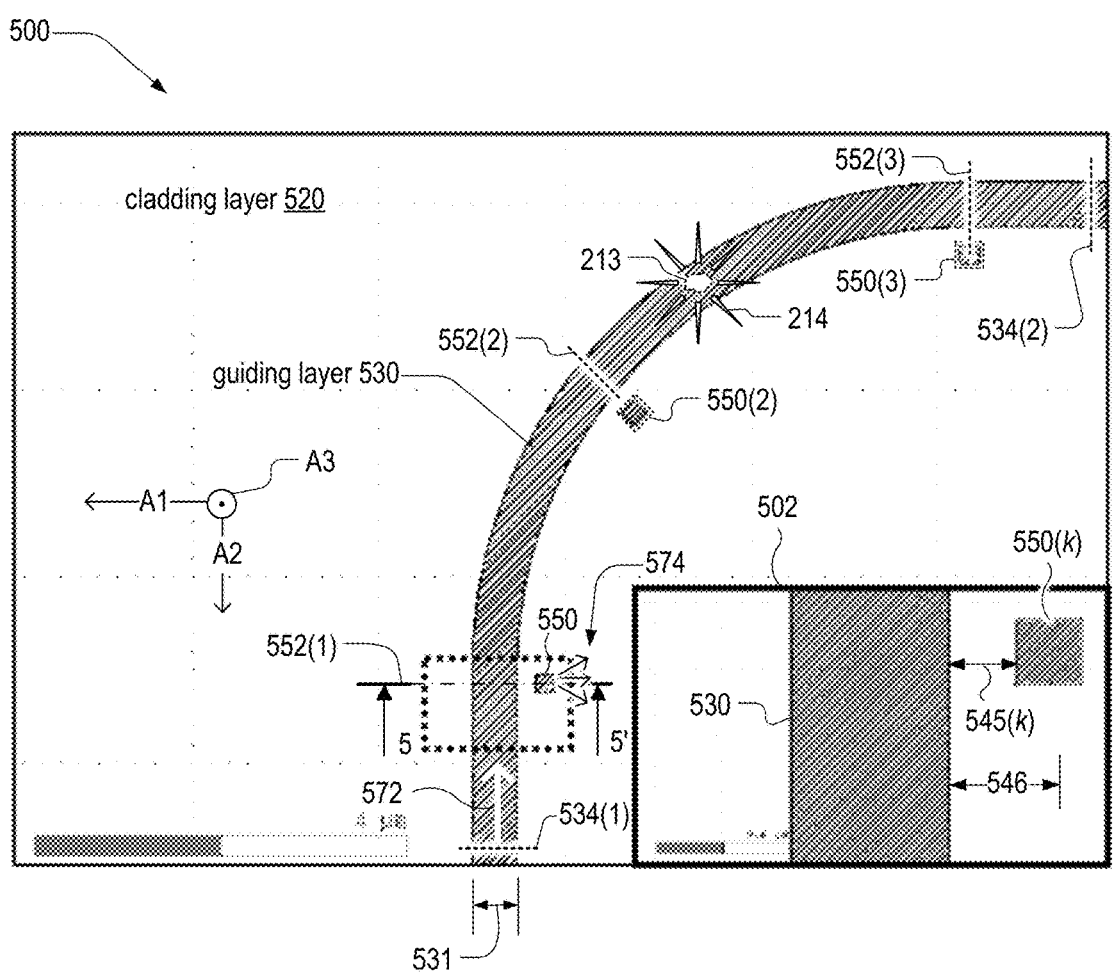

FIG. 5 is a schematic cross-sectional view of a photonic integrated circuit 500. FIG. 6 is a schematic plan view of photonic integrated circuit 500. The cross-sectional view of FIG. 5 is in a cross-sectional plane 5-5' shown in FIG. 6. Cross-sectional plane 5-5' is parallel to the A1-A2 plane. Photonic integrated circuit 500 includes a substrate 510, a cladding layer 520, a guiding layer 530, and a scattering element 550. Substrate 510 has a substrate top-surface 519 and a substrate refractive index. Cladding layer 520 is on substrate top-surface 519, has a cladding top-surface 529, and has a cladding refractive index. Axis A3 is perpendicular to top-surface 519.

Photonic integrated circuit 200, FIG. 2, is an example of photonic integrated circuit 500. Substrate 210, top surface 219, cladding layer 220, guiding layer 230, and scattering element 250, are examples of substrate 510, top surface 519, cladding layer 520, guiding layer 530, and scattering element 550 respectively.

To facilitate fabrication, guiding layer 530 and scattering element 550 may be formed of the same material, such as a semiconductor. Cladding layer 520 may be a dielectric. In embodiments, scattering element 550 is formed of one of a dielectric, a metal, a semiconductor, and a combination thereof. For example, scattering element 550 may be formed of silicon nitride or silicon.

Guiding layer 530 is located between substrate top-surface 519 and cladding top-surface 529. Guiding layer 530 and scattering element 550 have respective bottom surfaces 535 and 555, proximate substrate top-surface 519. In embodiments, for example when guiding layer 530 and scattering element 550 are formed in a same fabrication step, surfaces 535 and 555 are coplanar in a plane parallel to substrate top-surface 519.

Guiding layer 530 has (i) a core refractive index exceeding both the substrate refractive index and the cladding refractive index, (ii) a guiding-layer thickness 533 above the substrate top-surface 519, and (iii) a guiding-layer width 531 in a direction parallel to substrate top-surface 519. Guiding layer 530 supports an optical mode that, along axis A1, extends to a decay-range 546 into cladding layer 520. Decay-range 546 is, for example, a distance from the guiding layer at which the intensity of the optical mode decays to 1/e of its maximum value.

Each of guiding-layer thickness 533 and guiding-layer width 531 may be less than an in-medium wavelength of the optical mode. In embodiments, the in-medium wavelength is a free-space wavelength between 1.1 micrometers and 1.8 micrometers divided by a refractive index of guiding layer 530 at the free-space wavelength. For example, the free-space wavelength is either 1.3 micrometers or 1.55 micrometers. In embodiments, at least one of guiding-layer thickness 533 and guiding-layer width 531 is between 0.15 micrometers and 0.3 micrometers.

Scattering element 550 is (i) located between substrate top-surface 519 and cladding top-surface 529, and (ii) separated from guiding layer 530 by a gap-distance 545. Gap-distance 545 is in a plane parallel to top surface 519. To ensure weak coupling, gap-distance 545 may be greater than decay-range 546. To ensure adequate coupling, gap-distance 545 may be less than six times decay-range 546. For example, gap-distance 545 may be between 0.2 micrometers and 0.5 micrometers. Gap-distance 245 is an example of gap-distance 545.

Scattering element 550 has (a) a maximum spatial dimension that is less than the in-medium wavelength, and (b) a refractive index $n_{550}$. In embodiments, refractive index $n_{550}$ is greater than the refractive index of cladding layer 520 such that total-internal reflection may occur therein. In embodiments, the maximum spatial dimension of scattering element 550 is along one of axes A1 and A2. In embodiments, the maximum spatial dimension is at least one of (i) less than guiding-layer width 531, (ii) less than guiding-layer thickness 533 such that scattering element 550 produces a sufficiently weak perturbation in the mode with negligible power lost in the guided mode. The maximum spatial dimension may be greater than fifty nanometers to ensure sufficient scattering amplitude for measurement.

In an example mode of operation, guided mode 572 is a mode of guiding layer 530 and propagates in guiding layer 530 through a first plane 534(1) to a second plane 534(2) that intersects guiding layer 530. Scattering element 550 scatters a fraction of guided mode 572 as a scattered signal 574.

In embodiments, photonic integrated circuit 500 includes a plurality of additional scattering elements 550(2, 3, . . . , N), where N is a positive integer greater than or equal to three. FIG. 6 illustrates scattering elements 550(2) and 550(3), and in an inset 502, a scattering element 550(k), where k is a positive integer less than or equal to N. Each scattering element 550(k) is separated from a respective additional position 552(k) of a plurality of positions along guiding layer 530 by a respective gap-distance 545(k) that is less than decay-range 546. Each position 552(k) corresponds to a respective propagation distance of the optical mode in guiding layer 530 with respect to cross-sectional plane 5-5'. Along guiding layer 530, a distance between adjacent scattering elements 550 exceeds guiding-layer width 531.

Each of the plurality of scattering elements 550 may have the same spatial dimensions, which enables comparative measurements, e.g., of optical power or polarization, along guiding layer 530. For the same reasons, each of scattering elements 550 may be oriented at the same angle with respect to guiding layer 530.

In embodiments, cladding layer 520 completely surrounds guiding layer 530 in a plurality of transverse planes perpendicular to substrate top-surface 519, such that guiding layer 530 and cladding layer 520 form a photonic wire. For example, in PIC 200, cladding layer 220 completely surrounds guiding layer 230 in a plurality of planes that are parallel to the A1-A3 plane.

Diagnosing Scattering Defects

The disclosed photonic integrated circuits may include at least one deterministic scatterer, examples of which include scattering elements 250 and 550. Guiding layer 230 and 530 may include a defect scatterer 213, which may be a fabrication error and/or a random defect. A deterministic scatterer may be relied on to scatter light in the same manner from waveguide to waveguide, circuit to circuit, and chip to chip. However, fabrication errors, such as defect scatterer 213, are not deterministic. For example, line edge roughness in a fabrication process may induce excess waveguide scattering, as can errors in mask fabrication or exposure. The deterministic scatterer may, with suitable design, function as a reference source to interfere with the light from unknown scatterers, such as defect scatterer 213.

In this scenario, it is assumed that the deterministic scatterer designed into the circuit as a test point produces a stronger signal (e.g. signals 274 and 574) than a defect signal 214 from a defect scatterer 213. The signal, herein a "reference signal," may be stronger by a factor of ten to one hundred, for example. When viewed in the pupil plane (the so-called Fourier plane), the reference signal will interfere with scattered light from other points along the waveguide. As with deterministic scatterers, the location of defect scatterers 213 with respect to the reference scatterer (scattering elements 250 or 550) may be determined by a Fourier analysis of the fringes that form in the pupil plane. In this way, introducing a deterministic scatterer may provide quantitative information about unknown and unanticipated sources of loss in photonic integrated circuits 200 and 500.

APPLICATIONS

This section describes example applications 1-7 of the disclosed PIC characterization methods. Each of these applications has three common aspects. The first aspect is a source of light coupled to the waveguide, for example by use of an optical fiber that is attached to an external source, although in some cases there may be a source fabricated within the photonic integrated circuit. The second aspect is one or more waveguides incorporated into a photonic integrated circuit that function as photonic wires to connect components to one another and to allow light from the edge of the PIC to be routed to appropriate devices on the PIC. The third aspect is one or more scattering sites precisely fabricated so as to intersect with the evanescent field of the guide.

Example Application 1: Measuring the Polarization State of Coupled Light

Silicon scatterers placed beside (e.g. in the same layer) as a silicon waveguide scatter light well but show poor correlation with the input polarization states. By contrast, a scatterer placed above or below the waveguide (e.g. a silicon-nitride scatterer placed above a silicon waveguide) display a strong correlation with the input polarization. FIG. 4 displays the input polarization states of silicon guiding layer 430 in the upper plots 401 and 402. The numerically calculated output states at the pupil are shown (bottom plots 403 and 404) for the 200-nm×200-nm silicon-nitride scatterer placed above the waveguide. The strong correlation and polarization uniformity permits an accurate measurement of the polarization state within the waveguide.

Measuring the polarization of these scattered fields may be achieved either by imaging the pupil plane through a Bertrand lens to image the pupil and then introducing polarization elements into the imaging system for polarimetric analysis or by direct imaging of the scattered light through suitable polarimetric elements. The polarization elements may include a birefringent element, such as a quarter-wave plate, in combination with a polarizer, such as a linear polarizer. For direct imaging the birefringent element may also be a space-variant birefringent element such as a vortex waveplate or a stress engineered optic. In those cases, the polarizer would be either a circular polarizer or an anisotropic crystal such as calcite to physically separate orthogonal polarization components.

FIG. 7 is a schematic of an apparatus 700 detecting light scattered by a photonic integrated circuit 709, which may be used for polarization measurements of example applications 1-7. Photonic integrated circuit 709 includes a substrate 701, a guiding layer 703 directly on or above substrate 701, and a scattering element 705, which is either adjacent to or above guiding layer 703. Accordingly, each of PICs 200 and 500 is an example of photonic integrated circuit 709, each of guiding layers 230 and 530 is an example of guiding layer 703, and each of scattering elements 250 and 550 is an example of scattering element 705. Photonic integrated circuit 709 includes a cladding layer, not shown, of which cladding layer 220 and 520 are examples. The cladding layer and guiding layer 703 form a waveguide 708 of photonic integrated circuit 709.

Apparatus 700 includes a lens 710, a sensor 760, and in order of increasing distance along an optical path between lens 710 and sensor 760, at least one of a birefringent element 720, a tube lens 730, a Bertrand lens 740, and a polarizer 750. Sensor 760 may include at least one InGaAs photodiode, for example, when input light 771 includes one or more wavelengths between 0.8 micrometers and 1.7 micrometers. Sensor 760 may include an array of sensors configured to capture an image. For example, sensor 760 may include a detector array, such as a photodiode array. Sensor 760 may be a CCD image sensor or a CMOS image sensor. Lens 710 may be a positive lens, such as a microscope objective, and may have a focal length between one millimeter and two-hundred millimeters. For suitable resolution, magnification, and depth of focus, lens 710 may have a numerical aperture between 0.05 and 0.5. In embodiments, Bertrand lens 740 is a positive lens, located between lens 710 and sensor 760, that focuses an image of the exit pupil of lens 770 to a light-sensitive surface of sensor 760. Birefringent element 720 may be a quarter-wave plate, and polarizer 750 may be a linear polarizer.

In an example mode of operation, input light 771 propagates in an optical fiber 702 and is coupled to guiding layer 703 of photonic integrated circuit 709 as coupled light 772. Scattering element 705 scatters a fraction of coupled light 772 as a scattered signal 774, which apparatus 700 detects. Specifically, lens 710 collects scattered signal 774 and directs it to sensor 760 via at least one of birefringent element 720, tube lens 730, Bertrand lens 740, and polarizer 750. Birefringent element 720 and a polarizer 750 enable apparatus 700 to measure the polarization state of coupled light 772. Sensor 760 outputs a detected signal 769.

In embodiments, apparatus 700 includes a data processor 780 that is communicatively coupled to sensor 760 and receives detected signal 769. Data processor 780 includes a processor 781, a memory 782 communicatively coupled thereto, and may also include data acquisition hardware 784. Each of processor 781, memory 782, and data acquisition hardware 784 may be communicatively coupled, directly or indirectly, e.g., via a bus 786. In embodiments, sensor 760 is communicatively coupled to data acquisition hardware 784. Memory 782 stores non-transitory computer-readable instructions as software 783. When executed by processor 781, software 783 causes processor 781 to implement the functionality of data processor 780 as described herein. Software 783 may be, or include, firmware.

Memory 782 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 782 may be integrated into processor 781.

Example Application 2: Measuring Polarization Changes Through Waveguide Segments and Components FIG. 8 is a schematic of an apparatus 800 detecting light scattered by photonic integrated circuit 200, which may be used for polarization measurements of example applications 1-3. Apparatus 800 may also be used to monitor changes in the polarization of light through waveguide segments and components. Apparatus 800 is an example of apparatus 700 that does not include Bertrand lens 740, such that the shape of the point spread function at the waveguide layer provides unambiguous information about the polarization of the light in the guide.

Apparatus 800 includes a lens 810, sensor 760, and in order of increasing distance along an optical path between lens 710 and sensor 760, at least one of birefringent element 720, tube lens 730, and polarizer 750. Lens 810 is located at distance 812 from scattering element 705. Lens 810 may be a positive lens, such as a microscope objective, and may have a focal length between one millimeter and two-hundred millimeters.

In an example mode of operation, input light 771 propagates in optical fiber 702 and is coupled to guiding layer 703 of photonic integrated circuit 709 as coupled light 772. Scattering element 705 scatters a fraction of coupled light 772 as scattered signal 774, which apparatus 800 detects. Specifically, lens 810 collects scattered signal 774 and directs it to sensor 760 via at least one of birefringent element 720, tube lens 730, and polarizer 750. Birefringent element 720 and a polarizer 750 enable apparatus 700 to measure the polarization state of guided mode 272 or 572. In embodiments, lens 810 collimates scattered signal 774. Each of scattered signal 274 and 574 is an example of scattered signal 774. Sensor 760 outputs a detected signal 869.

Forming a pupil image of a pair of scatterers forms an interference pattern that may reveal the phase shift along guiding layer 703 between the pair of scatterers. When the measurement is carried out with a broadband or tunable source, the dispersion and effective index of the guide may be measured. By carrying out such a measurement with a tunable laser source, it is also possible to measure propagation-induced changes in polarization as a function of wavelength.

Example Application 3: Polarization Measurement

A use of embodiments disclosed herein is for polarization measurement along a photonic integrated circuit. Scattering elements 250 and 550 may also be used for applications that were previously outlined for silicon scattering element with a silicon waveguide. These applications include: monitoring input coupling for fiber attachment, measuring waveguide loss and dispersion, with calibrating optical backscatter. The silicon-nitride elements introduced above have the same function as they introduce little loss (less than silicon scatters) and still produce a signal at the camera sensor.

Example Application 4: Measuring Waveguide Loss

By monitoring a sequence of scattering elements 705 along the length of guiding layer 703, it is possible to precisely probe the light inside guiding layer 703 by means of the irradiance on the sensor at the image of scattering elements 705. By comparing the strength of the scattered signal at discrete points along guiding layer 703, it is possible to make a direct measurement of the propagation losses in a waveguide formed by guiding layer 703 and the cladding layer of photonic integrated circuit 709.

Figure 9:
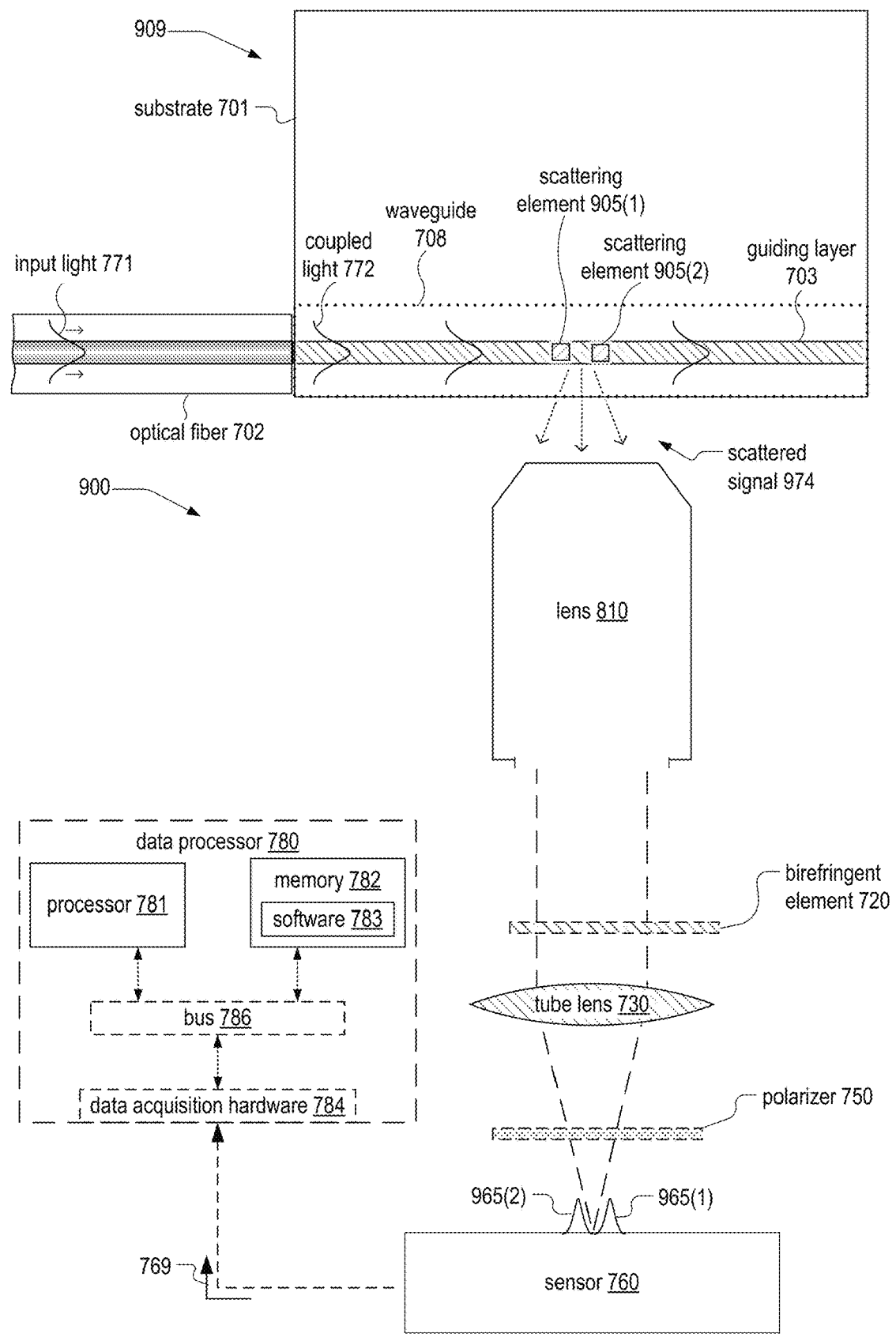
FIG. 9 is a schematic of an apparatus used to characterize propagation loss of a waveguide of a photonic integrated circuit, in an embodiment.

For example, FIG. 9 is a schematic of an apparatus 900 detecting light scattered by scattering elements 905(1) and 905(2) of a photonic integrated circuit 909. Photonic integrated circuit 909 is an example of photonic integrated circuit 709, where scattering elements 905 replaces each scattering element 705. Apparatus 900 is an example of apparatus 800 that includes tube lens 730. Apparatus 900 captures a scattered signal 974, which includes respective scattered signals from scattering elements 905(1,2). Lenses 810 and 730 image scattering elements 905 onto sensor 760 as scattering-element images 965(1) and 965(2). Comparing the signal strength of scattering-element images 965, e.g., their respective intensities, yields an accurate measurement of propagation loss in waveguide 708.

Example Application 5: Measuring Polarization Changes Through Waveguide Segments and Components In embodiments, apparatus 900 includes birefringent element 720 and polarizer 750. In such embodiments, apparatus 900 may also be used to monitor changes in the polarization of light through waveguide segments and components. Birefringent element 720 may be configured such that the shape of the point spread function provides unambiguous information about the polarization of the light in the guide. By carrying out such a measurement with a tunable laser source, it is also possible to measure propagation-induced changes in polarization as a function of wavelength.

Figure 10:
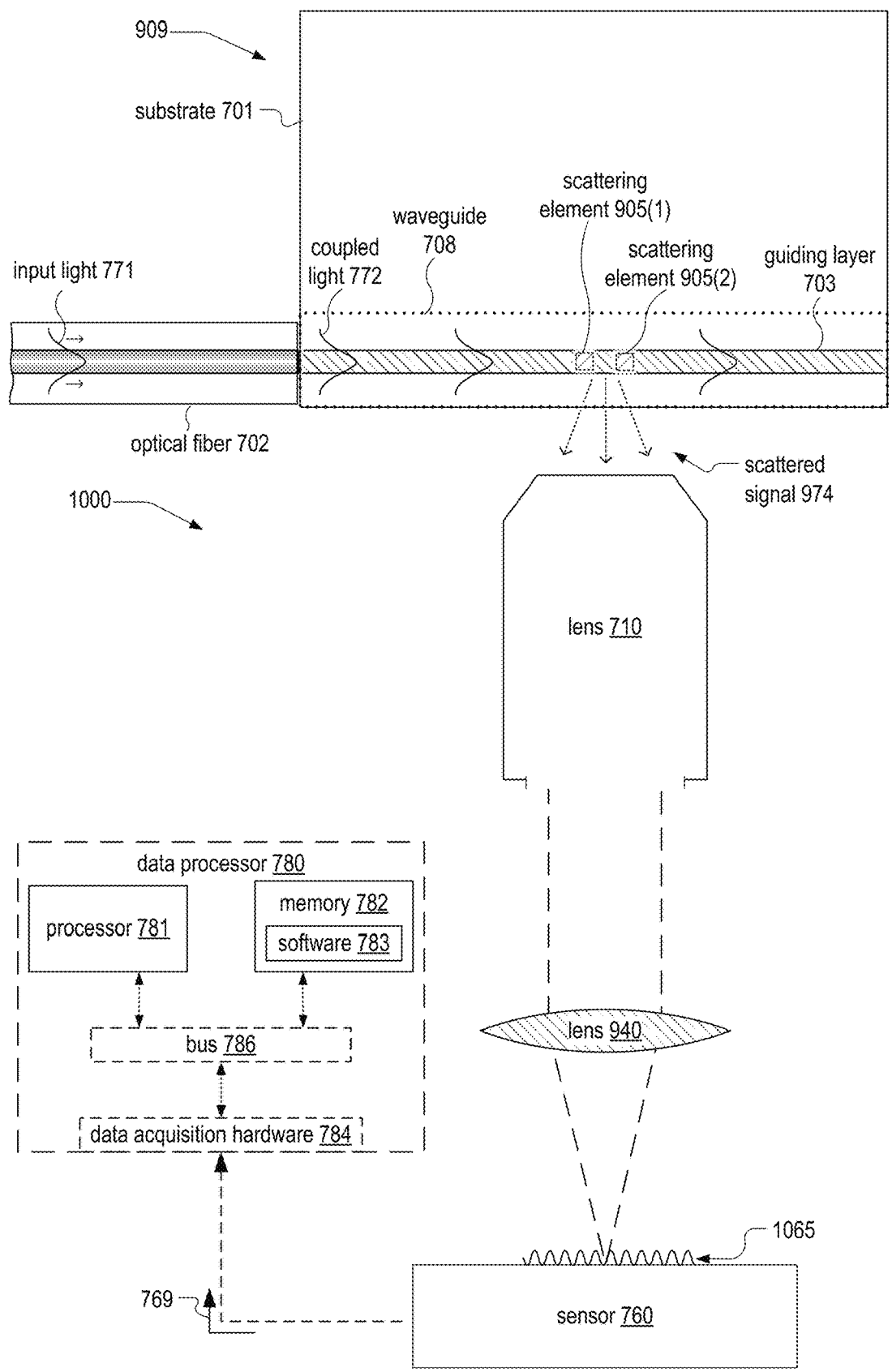
FIG. 10 is a schematic of an apparatus used to characterize dispersion of a waveguide of a photonic integrated circuit, in an embodiment.

Example Application 6: Measuring Dispersion of Waveguide Segments and Components FIG. 10 is a schematic of an apparatus 1000 for characterizing photonic integrated circuit 909 by forming a pupil image, of scattering elements 905, on sensor 760. Whereas apparatus 900 forms a direct image of photonic integrated circuit 909, apparatus 1000 includes a lens 940, which forms a pupil image. Lens 940 may be a Bertrand lens, which forms a two-dimensional pupil image, or a cylindrical lens, which forms a one-dimensional image along a direction between scattering elements 905. The pupil image includes an interference pattern 1065, from which the phase shift of coupled light 772 between scattering elements 905 may be determined. When the measurement is carried out with a broadband or tunable source, the dispersion and effective index of waveguide 708 can be measured.

Example Application 7: Calibrating Optical Backscatter

Figure 11:
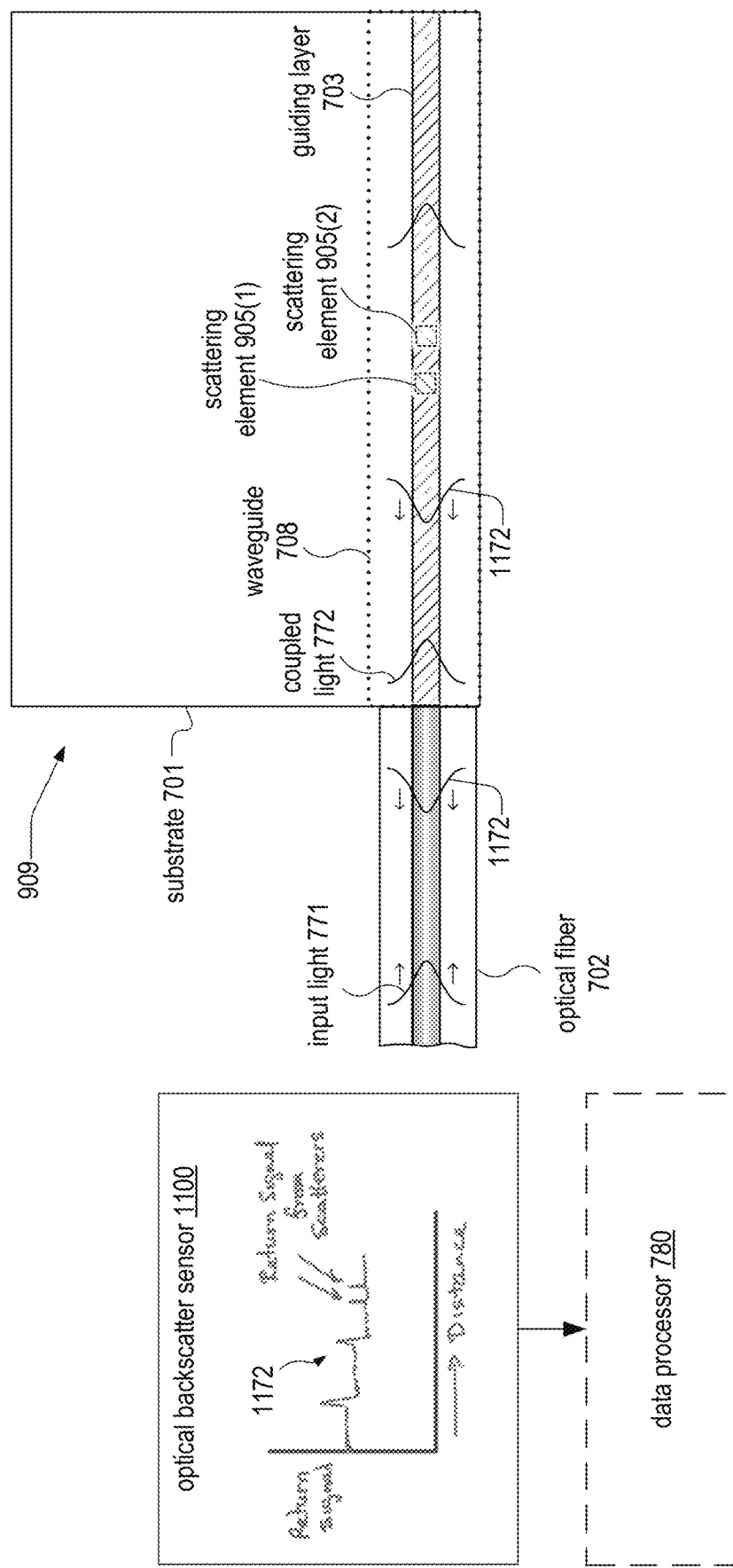
FIG. 11 is a schematic of a photonic integrated circuit used to calibrate an optical backscatter sensor, in an embodiment.

FIG. 11 is a schematic of photonic integrated circuit 909 optically coupled to an optical backscatter sensor 1100, hereinafter sensor 1100. Sensor 1100 may be a reflectometer. Photonic integrated circuit 909 may be used to calibrate sensor 1100, for example, when the following is known with high accuracy (i) a physical separation between scattering elements 905 along guiding layer 703, and (ii) the amount of coupled light 772 each scattering element 905 back-scatters into guiding layer 703. The back-scattered light, return signal 1172 in FIG. 11, propagates in guiding layer 703 in a direction opposite that of coupled light 772. Sensor 1100 may be communicatively coupled to data processor 780, which processes return signal 1172 to calibrate sensor 1100.

Figure 12:
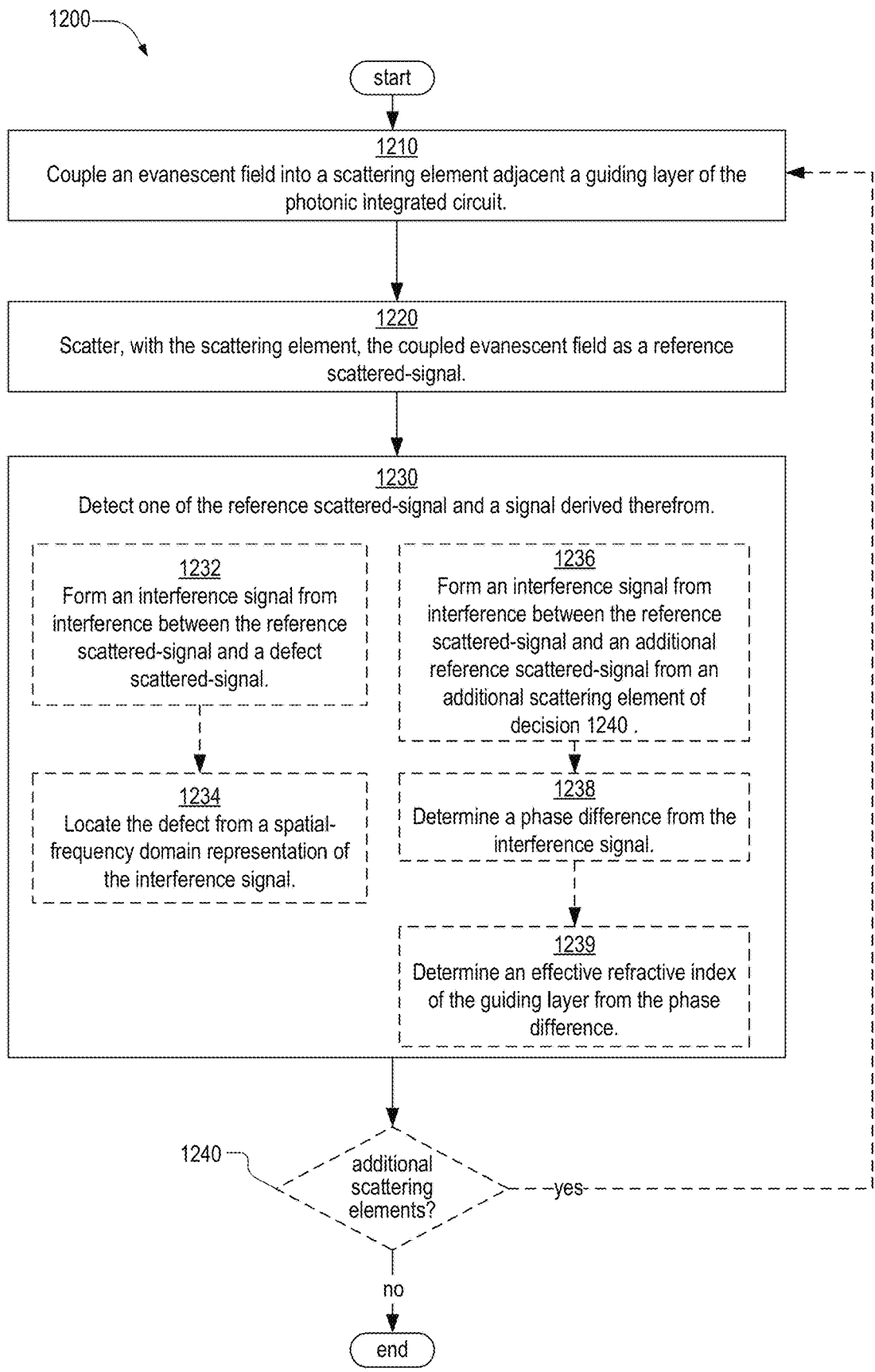
FIG. 12 is a flowchart illustrating a method for characterizing a photonic integrated circuit, in an embodiment.

FIG. 12 is a flowchart illustrating a method 1200 for characterizing a photonic integrated circuit, such as photonic integrated circuits 200 and 700. Method 1200 includes at least steps 1210, 1220, and 1230.

Step 1210 includes coupling an evanescent field into a scattering element adjacent to a guiding layer of the photonic integrated circuit. The evanescent field is of an optical mode of light propagating in the guiding layer and has an in-medium wavelength in the guiding layer. A maximum spatial dimension of the scattering element is less than the in-medium wavelength. In a first example of step 1210, an evanescent field of guided mode 272 is coupled into scattering element 250, of PIC 200, FIG. 7. In a second example of step 1210, an evanescent field of guided mode 572 is coupled into scattering element 550 of photonic integrated circuit 500, FIG. 5.

Step 1220 includes scattering, with the scattering element, the coupled evanescent field as a reference scattered-signal. In an example of step 1220, scattering element 250 scatters the evanescent field of guided mode 272 as scattered signal 274, FIG. 2. In a second example of step 1220, scattering element 550 scatters the evanescent field of guided mode 572 as scattered signal 574, FIG. 5. Each of scattered signals 274 and 754 is an example of scattered signal 774, FIG. 7.

Step 1230 includes detecting one of the reference scattered-signal and a signal derived therefrom. In an example of step 1230, one of apparatus 700 and apparatus 800 detects scattered signal 774, FIG. 7. When the guiding layer includes a defect that produces a defect scattered-signal, step 1230 may include at least one of steps 1232 and 1234. Step 1232 includes forming an interference signal from interference between the reference scattered-signal and the defect scattered-signal. In an example of step 1232, scattered signal 774 and defect signal 214 interfere to yield an interference signal.

Step 1234 includes locating the defect from a spatial-frequency domain representation of the interference signal. In an example of step 1234, sensor 760 includes a detector array, and data processor 780 generates a spatial-frequency domain representation of detected signal 769 and locates defect scatterer 213 from the spatial-frequency domain representation. In embodiments, data processor 780 determines defect scatterer 213 from a dominant spatial-frequency component of the spatial-frequency domain representation, e.g., a spatial frequency component with the largest amplitude. The angle between defect scatterer 213 and scattering element 550 determines the spatial frequency corresponding to this dominant spatial-frequency component, as respective detected signal 769 includes interference between scattered signal 774 and defect signal 214. The vertex of the angle may be along an optical axis of lens 710 or lens 810, for example, the vertex is in the entrance-pupil plane or exist-pupil plane of lens 710 or lens 810. The vertex location may be located at working distance of lens 710 or 810 from scattering element 705. The location of defect scatterer 213 may be determined trigonometrically with the working distance, and the angle determined from the dominant spatial frequency component.

When the scattering element is one of a plurality of scattering elements positioned adjacent to the guiding layer, method 1200 may include a step 1240. Step 1240 includes repeating the steps of coupling (step 1210), scattering (step 1220), and detecting (step 1230) to yield a respective reference scattered-signal of a plurality of reference scattered-signals and a respective scattered-light amplitude of a plurality of scattered-light amplitudes. In an example of step 1240, steps 1210, 1220, and 1230 are repeated for each scattering element $250(k \geq 2)$ or for each scattering element $550(k \geq 2)$.

When method 1200 includes step 1240, step 1230 may include at least one of steps 1236, 1238, and 1239. Step 1236 includes forming an interference signal from interference between the reference scattered-signal and the additional reference scattered-signal. In an example of step 1236, photonic integrated circuit 709 includes an additional scattering element 705(2) that produces an additional scattered signal 774(2), which interferes with scattered signal 774 to produce an interference signal. Plots 403 and 404 of FIG. 4 illustrate examples of the interference signal.

Step 1238 includes determining a phase difference from the interference signal. Step 1239 includes determining an effective refractive index, e.g. a mode index, of the guiding layer from the phase difference. In example of step 1238, data processor 780 of apparatus 700 (or 800) determines a phase difference from detected signal 769 (or 869). In example of step 1239, data processor 780 determines an effective refractive index of guiding layer 703. In embodiments, memory 782 stores a distance between scattering elements 705 and 705(2), and uses this distance in at least one of steps 1238 and 1239.

Combinations of Features

Features described above as well as those claimed below may be combined in various ways without departing from the scope hereof. The following enumerated examples illustrate some possible, non-limiting combinations (A1) A photonic integrated circuit includes a substrate, a cladding layer, and a guiding layer. The substrate has a substrate top-surface and a substrate refractive index. The cladding layer is on the substrate top-surface and has a cladding top-surface and a cladding refractive index. The guiding is layer located between the substrate top-surface and the cladding top-surface and having (i) a core refractive index exceeding both the substrate refractive index and the cladding refractive index, (ii) a guiding-layer thickness above the substrate top-surface, and (iii) a guiding-layer width. In a direction parallel to the substrate top-surface, the guiding layer supports an optical mode that extends to a decay-range into the cladding layer in the direction. An in-medium wavelength of the optical mode exceeds both the guiding-layer thickness and the guiding-layer width. The scattering element is (i) located between the substrate top-surface and the cladding top-surface and (ii) separated from the guiding layer by a gap-distance that is less than the decay-range, and has (a) a maximum spatial dimension that is less than the in-medium wavelength, and (b) a scattering refractive index that exceeds the cladding refractive index.

(A2) In embodiments of photonic integrated circuit (A1) the gap-distance is a distance between the scattering element and a position on the guiding layer. Such embodiments further include a plurality of additional scattering elements each separated from a respective additional position of a plurality of positions along the guiding layer by less than the decay-range. Each of the plurality of positions corresponds to a respective propagation distance of the optical mode in the guiding layer from the position. A distance between adjacent scattering elements of the plurality of additional scattering elements exceeds the guiding-layer width. Each of the plurality of additional scattering elements has a same size and shape as the scattering element.

(A3) In embodiments of photonic integrated circuit (A2), each of the plurality of additional scattering elements has, with respect to the guiding layer, a same orientation as the scattering element.

(A4) In embodiments of any one of photonic integrated circuits (A1)-(A3), the maximum spatial dimension is at least one of (i) less than the guiding-layer width and (ii) greater than fifty nanometers.

(A5) In embodiments of any one of photonic integrated circuits (A1)-(A4), the maximum spatial dimension is at least one of (i) less than the guiding-layer thickness and (ii) greater fifty nanometers.

(A6) In embodiments of any one of photonic integrated circuits (A1)-(A5), the cladding layer completely surrounds the guiding layer in a plurality of transverse planes perpendicular to the substrate top-surface, such that the guiding layer and the cladding layer form a photonic wire.

(A7) In embodiments of any one of photonic integrated circuits (A1)-(A6), the gap-distance is at least one of (i) greater than $\gamma$ and (ii) less than $6\gamma$, where $\gamma$ is a distance from the guiding layer at which the intensity of the optical mode decays to $1/e$ of its maximum value.

(A8) In embodiments of any one of photonic integrated circuits (A1)-(A7), the in-medium wavelength is a free-space wavelength between 1.1 micrometers and 1.8 micrometers divided by a refractive index of the guiding layer at the free-space wavelength.

(A9) In embodiments of any one of photonic integrated circuits (A1)-(A8), the guiding-layer width is between 0.15 micrometers and 0.5 micrometers.

(A10) In embodiments of any one of photonic integrated circuits (A1)-(A9), the guiding-layer thickness is between 0.15 micrometers and 0.3 micrometers.

(A11) In embodiments of any one of photonic integrated circuits (A1)-(A10), the scattering element and the guiding layer is formed of a same material.

(A12) In embodiments of any one of photonic integrated circuits (A1)-(A11), the scattering element is formed of a one of a dielectric, a metal, a semiconductor, and a combination thereof.

(A13) In embodiments of any one of photonic integrated circuits (A1)-(A12), the scattering element is adjacent to the guiding layer in a direction parallel to the substrate top-surface, the gap-distance being along the direction.

(A14) In embodiments of photonic integrated circuit (A13), the scattering element and the guiding layer have respective bottom surfaces, proximate the substrate top-surface, that are coplanar in a plane parallel to the substrate top-surface.

(A15) In embodiments of any one of photonic integrated circuits (A1)-(A14), in a surface-normal direction perpendicular to the substrate top-surface, the guiding layer is between the scattering element and the substrate-top surface, and the gap-distance is along the surface-normal direction.

(B1) A method for characterizing a photonic integrated circuit comprising includes coupling an evanescent field into a scattering element adjacent to a guiding layer of the photonic integrated circuit. The evanescent field is of an optical mode of light propagating in the guiding layer, and has an in-medium wavelength in the guiding layer. A maximum spatial dimension of the scattering element is less than the in-medium wavelength. The method includes scattering, with the scattering element, the coupled evanescent field as a reference scattered-signal. The method also includes detecting one of the reference scattered-signal and a signal derived therefrom.

(B2) In embodiments of method (B1), when the guiding layer includes a defect that produces a defect scattered-signal, said step of detecting includes: forming an interference signal from interference between the reference scattered-signal and the defect scattered-signal; and locating the defect from a spatial-frequency domain representation of the interference signal.

(B3) When the scattering element is one of a plurality of scattering elements positioned adjacent to the guiding layer, embodiments of either one of methods (B2) and (B3) include, for each of the plurality of scattering elements: repeating the steps of coupling, scattering, and detecting to yield a respective reference scattered-signal of a plurality of reference scattered-signals and a respective scattered-light amplitude of a plurality of scattered-light amplitudes.

(B4) When the plurality of reference scattered-signals includes the reference scattered-signal and an additional reference scattered-signal scattered from an additional scattering element of the plurality of scattering elements, embodiments of any one of methods (B1)-(B3) include, as part of the step of detecting: forming an interference signal from interference between the reference scattered-signal and the additional reference scattered-signal; determining a phase difference from the interference signal; and determining an effective refractive index of the guiding layer from the phase difference.

(B5) In embodiments of method (B4), the step of detecting includes determining a polarization of the reference scattered-signal.

(B6) In embodiments of any one of methods (B1)-(B5), the evanescent field is of an optical mode propagating in the photonic integrated circuit.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A photonic integrated circuit, comprising:
    a substrate having a substrate top-surface and a substrate refractive index;
    a cladding layer on the substrate top-surface and having a cladding top-surface and a cladding refractive index;
    a guiding layer located between the substrate top-surface and the cladding top-surface and having (i) a core refractive index exceeding both the substrate refractive index and the cladding refractive index, (ii) a guiding-layer thickness above the substrate top-surface, and (iii) a guiding-layer width, in a direction parallel to the substrate top-surface, the guiding layer supporting an optical mode that extends to a decay-range into the cladding layer in the direction, an in-medium wavelength of the optical mode exceeding both the guiding-layer thickness and the guiding-layer width; and
    a scattering element (i) having a bottom surface, proximate the cladding top-surface, located between the substrate top-surface and the cladding top-surface and (ii) separated from the guiding layer by a gap-distance that is less than the decay-range, and (iii) having (a) a maximum spatial dimension that is less than the in-medium wavelength, and (b) a scattering refractive index that exceeds the cladding refractive index.

2. The photonic integrated circuit of claim 1, the gap-distance being a distance between the scattering element and a position on the guiding layer, and further comprising:
    a plurality of additional scattering elements each separated from a respective additional position of a plurality of positions along the guiding layer by less than the decay-range, each of the plurality of positions corresponding to a respective propagation distance of the optical mode in the guiding layer from the position;
    a distance between adjacent scattering elements of the plurality of additional scattering elements exceeding the guiding-layer width; and
    each of the plurality of additional scattering elements having a same size and shape as the scattering element.

3. The photonic integrated circuit of claim 2, each of the plurality of additional scattering elements having a same orientation, with respect to the guiding layer, as the scattering element.

4. The photonic integrated circuit of claim 1, the maximum spatial dimension being at least one of (i) less than the guiding-layer width and (ii) greater than fifty nanometers.

5. The photonic integrated circuit of claim 1, the maximum spatial dimension being at least one of (i) less than the guiding-layer thickness and (ii) greater fifty nanometers.

6. The photonic integrated circuit of claim 1, the cladding layer completely surrounding the guiding layer in a plurality of transverse planes perpendicular to the substrate top-surface, such that the guiding layer and the cladding layer form a photonic wire.

7. The photonic integrated circuit of claim 1, the gap-distance being at least one of (i) greater than $\gamma$ and (ii) less than $6\gamma$, where $\gamma$ is a distance from the guiding layer at which the intensity of the optical mode decays to $1/e$ of its maximum value.

8. The photonic integrated circuit of claim 1, the in-medium wavelength being a free-space wavelength between 1.1 micrometers and 1.8 micrometers divided by a refractive index of the guiding layer at the free-space wavelength.

9. The photonic integrated circuit of claim 1, the guiding-layer width being between 0.15 micrometers and 0.5 micrometers.

10. The photonic integrated circuit of claim 1, the scattering element and the guiding layer being formed of a same material.

11. The photonic integrated circuit of claim 1, the scattering element being formed of a one of a dielectric, a metal, a semiconductor, and a combination thereof.

12. The photonic integrated circuit of claim 1, the scattering element being beside the guiding layer in a direction parallel to the substrate top-surface, the gap-distance being along the direction.

13. The photonic integrated circuit of claim 12, the scattering element and the guiding layer having respective bottom surfaces, proximate the substrate top-surface, that are coplanar in a plane parallel to the substrate top-surface.

14. The photonic integrated circuit of claim 1, in a surface-normal direction perpendicular to the substrate top-surface, the guiding layer being between the scattering element and the substrate top-surface, and the gap-distance being along the surface-normal direction.

15. A method for characterizing a photonic integrated circuit comprising:
    coupling an evanescent field into a scattering element proximate to a guiding layer of the photonic integrated circuit, the evanescent field being of an optical mode of light propagating in the guiding layer and having an in-medium wavelength in the guiding layer, a maximum spatial dimension of the scattering element being less than the in-medium wavelength;
    scattering, with the scattering element, the coupled evanescent field as a reference scattered-signal; and
    detecting one of the reference scattered-signal and a signal derived therefrom.

16. The method of claim 15, the guiding layer including a defect that produces a defect scattered-signal, said step of detecting comprising:
    forming an interference signal from interference between the reference scattered-signal and the defect scattered-signal; and
    locating the defect from a spatial-frequency domain representation of the interference signal.

17. The method of claim 15, the scattering element being one of a plurality of scattering elements positioned adjacent to the guiding layer, and further comprising, for each of the plurality of scattering elements:
    repeating the steps of coupling, scattering, and detecting to yield a respective reference scattered-signal of a plurality of reference scattered-signals and a respective scattered-light amplitude of a plurality of scattered-light amplitudes.

18. The method of claim 17, the plurality of reference scattered-signals including the reference scattered-signal and an additional reference scattered-signal scattered from an additional scattering element of the plurality of scattering elements, said step of detecting comprising:
   forming an interference signal from interference between the reference scattered-signal and the additional reference scattered-signal;
   determining a phase difference from the interference signal; and
   determining an effective refractive index of the guiding layer from the phase difference.

19. The method of claim 18, the step of detecting comprising determining a polarization of the reference scattered-signal.

20. The method of claim 15, the evanescent field being of an optical mode propagating in the photonic integrated circuit.

* * * * *